US012762949B2

(12) United States Patent
Murakami

(10) Patent No.: US 12,762,949 B2
(45) Date of Patent: Oct. 13, 2026

(54) OPERATION MANAGEMENT APPARATUS, OPERATION MANAGEMENT METHOD, AND NONTRANSITORY COMPUTER RECORDING MEDIUM

(71) Applicants: TOYOTA JIDOSHA KABUSHIKI KAISHA, Aichi-ken (JP); DENSO CORPORATION, Aichi-pref (JP)

(72) Inventor: Yoshihiro Murakami, Nagoya (JP)

(73) Assignees: TOYOTA JIDOSHA KABUSHIKI KAISHA, Aichi-Ken (JP); DENSO CORPORATION, Aichi-pref (JP)

(*) Notice: Subject to any disclaimer, the term of this patent is extended or adjusted under 35 U.S.C. 154(b) by 73 days.

(21) Appl. No.: 18/827,852

(22) Filed: Sep. 9, 2024

(65) Prior Publication Data

US 2025/0104556 A1 Mar. 27, 2025

(30) Foreign Application Priority Data

Sep. 25, 2023 (JP) ................................ 2023-161490

(51) Int. Cl.
*G08G 1/0967* (2006.01)
*B60W 60/00* (2020.01)

(52) U.S. Cl.
CPC ..... *G08G 1/096716* (2013.01); *B60W 60/001* (2020.02); *B60W 2556/45* (2020.02)

(58) Field of Classification Search
CPC .......... G08G 1/096716; B60W 60/001; B60W 2556/45
See application file for complete search history.

(56) References Cited

U.S. PATENT DOCUMENTS

| | | | | |
|---|---|---|---|---|
| 10,866,106 B2* | 12/2020 | Arakawa | .............. | G05D 1/0088 |
| 10,991,176 B2* | 4/2021 | Yoshizaki | ............ | G07C 5/0891 |
| 10,991,254 B2* | 4/2021 | Hayashi | ................. | G06Q 10/02 |
| 11,048,263 B2* | 6/2021 | Urano | ............... | B60W 60/0018 |
| 11,052,780 B2* | 7/2021 | Taguchi | .................. | B60L 53/36 |
| 11,281,215 B2* | 3/2022 | Yoshizaki | ............ | G05D 1/0088 |
| 2018/0181135 A1* | 6/2018 | Urano | ................... | B60W 40/08 |
| 2019/0086222 A1* | 3/2019 | Arakawa | ................ | G08G 1/202 |
| 2019/0126766 A1* | 5/2019 | Taguchi | ................. | G06Q 50/40 |

(Continued)

FOREIGN PATENT DOCUMENTS

| | | | | |
|---|---|---|---|---|
| CN | 111095955 A * | 5/2020 | ......... | H04L 63/1416 |
| JP | 2023-001493 A | 1/2023 | | |

*Primary Examiner* — Redhwan K Mawari

(74) *Attorney, Agent, or Firm* — HAUPTMAN HAM, LLP

(57) ABSTRACT

An operation management apparatus configured to manage the operation of a plurality of vehicles capable of autonomous driving includes a communication part configured to be able to communicate with the vehicles and a processing part. The processing part is configured to detect the presence of any abnormal vehicle exhibiting abnormal behavior from among the plurality of vehicles and, if detecting the presence of an abnormal vehicle, to transmit a stop signal to the vehicles whose operation is being managed for ordering them to stop when receiving from the abnormal vehicle an abnormal communication incidence signal informing it that there has been abnormal communication different from the usual communications to the abnormal vehicle and to transmit the stop signal to only the abnormal vehicle when not receiving from the abnormal vehicle the abnormal communication incidence signal.

8 Claims, 5 Drawing Sheets

(56) References Cited

U.S. PATENT DOCUMENTS

| | | | | |
|---|---|---|---|---|
| 2019/0128694 | A1* | 5/2019 | Matsushita | G10L 13/00 |
| 2019/0129420 | A1* | 5/2019 | Yoshizaki | B60W 30/10 |
| 2019/0129438 | A1* | 5/2019 | Morita | G06Q 10/08 |
| 2019/0147671 | A1* | 5/2019 | Yoshizaki | G07C 5/0891 701/29.1 |
| 2019/0180628 | A1* | 6/2019 | Hayashi | G06Q 10/083 |
| 2019/0278276 | A1* | 9/2019 | Zhang | G05D 1/027 |
| 2020/0189610 | A1* | 6/2020 | Sakai | B60W 60/00256 |
| 2020/0324788 | A1* | 10/2020 | Ando | B60W 60/001 |
| 2021/0192945 | A1* | 6/2021 | Kaneichi | G08G 1/081 |
| 2021/0276577 | A1* | 9/2021 | Adams | B60W 50/038 |
| 2022/0176946 | A1* | 6/2022 | McKinzie | B60W 10/02 |
| 2022/0224700 | A1* | 7/2022 | Appel | H04L 63/1441 |
| 2024/0182072 | A1* | 6/2024 | Sim | B60W 60/0016 |

* cited by examiner

OPERATION MANAGEMENT APPARATUS, OPERATION MANAGEMENT METHOD, AND NONTRANSITORY COMPUTER RECORDING MEDIUM

RELATED APPLICATIONS

The present application claims priority of Japanese Patent Application No. 2023-161490 filed Sep. 25, 2023, the disclosure of which is hereby incorporated by reference herein in its entirety.

FIELD

The present invention relates to an operation management apparatus, operation management method, and nontransitory computer recording medium.

BACKGROUND

Japanese Unexamined Patent Publication No. 2023-1493 discloses a conventional vehicle operation system managing operation of autonomous taxis which is configured to detect an autonomous taxi being hacked and in response cutting a line of communication between the hacked autonomous taxi and the outside.

SUMMARY

It is expected that passenger transport services, package delivery services, product sales services, and other mobility services using a plurality of service vehicles capable of autonomous driving will become widespread. If the businesses offering mobility services are targeted by cyber attacks, it is necessary to secure the safety of the users of the service vehicles while continuing to provide the services to the extent possible in the individual service vehicles.

The present invention was made focusing on such a problem and has as its object to secure the safety of the users of service vehicles while continuing to provide the services to the extent possible in the individual service vehicles if the businesses offering mobility services are targeted by cyber attacks.

To solve this problem, the operation management apparatus according to one aspect of the present invention for managing the operation of a plurality of vehicles capable of autonomous driving is provided with a communication part configured to be able to communicate with the vehicles and a processing part. The processing part is configured to detect the presence of any abnormal vehicle exhibiting abnormal behavior from among the plurality of vehicles and, if detecting the presence of an abnormal vehicle, to transmit a stop signal to all vehicles whose operation is being managed for ordering them to stop when receiving from the abnormal vehicle an abnormal communication incidence signal informing it that there has been abnormal communication different from usual communications to the abnormal vehicle and to transmit a stop signal to only the abnormal vehicle when not receiving from the abnormal vehicle an abnormal communication incidence signal.

Further, a nontransitory computer recording medium containing a computer program according to another aspect of the present invention for use by an operation management apparatus communicating with a plurality of vehicles capable of autonomous driving and managing the operation of the vehicles makes the operation management apparatus detect the presence of any abnormal vehicle exhibiting abnormal behavior from among the plurality of vehicles and, if detecting the presence of an abnormal vehicle, makes it transmit a stop signal to all vehicles whose operation is being managed for ordering them to stop when receiving from the abnormal vehicle an abnormal communication incidence signal informing it that there has been abnormal communication different from the usual communications to the abnormal vehicle and makes it transmit a stop signal to only the abnormal vehicle when not receiving from the abnormal vehicle an abnormal communication incidence signal.

An operation management method according to another aspect of the present invention using an operation management apparatus communicating with a plurality of vehicles capable of autonomous driving and managing the operation of the vehicles detects the presence of any abnormal vehicle exhibiting abnormal behavior from among the plurality of vehicles and, if detecting the presence of an abnormal vehicle, transmits a stop signal to all vehicles whose operation is being managed for ordering them to stop when receiving from the abnormal vehicle an abnormal communication incidence signal informing it that there has been abnormal communication different from the usual communications to the abnormal vehicle and transmits a stop signal to only the abnormal vehicle when not receiving from the abnormal vehicle an abnormal communication incidence signal.

According to these aspects of the present invention, it is possible to secure the safety of the users of service vehicles while continuing to provide services to the extent possible in individual service vehicles if a business offering a mobility service is targeted by cyber attacks.

DESCRIPTION OF EMBODIMENTS

Figure 1:
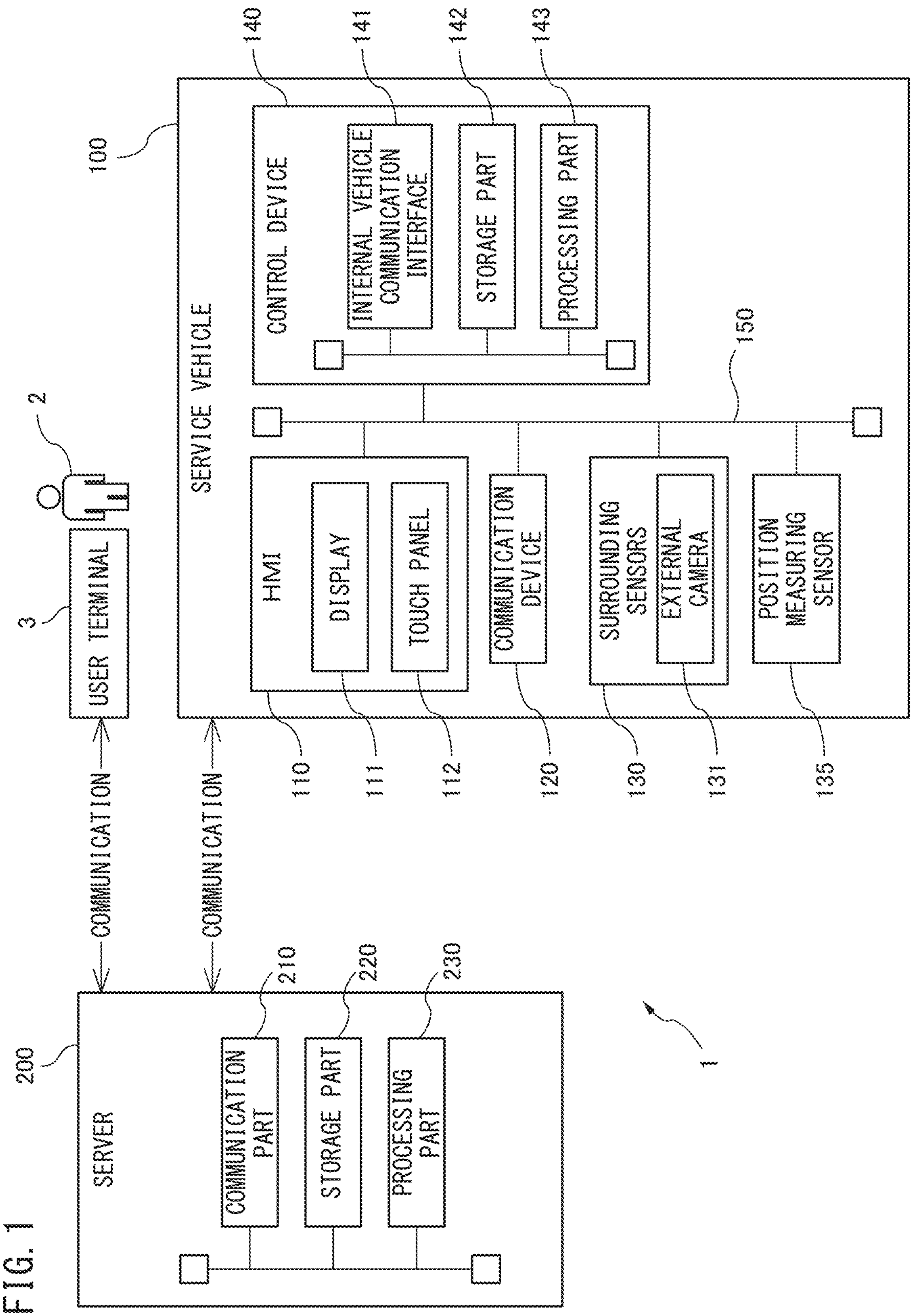
FIG. 1 is a schematic view of the configuration of a vehicle operation system of a first embodiment of the present invention.

Below, referring to the drawings, embodiments of the present invention will be explained in detail. Note that, in the following explanation, similar components will be assigned the same reference numerals.

First Embodiment

FIG. 1 is a schematic view of the configuration of a vehicle operation system 1 of a first embodiment of the present invention.

The vehicle operation system 1 is provided with a plurality of service vehicles 100 and a server 200 for managing operation of the service vehicles 100. Note that, the service vehicles 100 are configured in the same way, so FIG. 1 shows the configuration of only one service vehicle 100.

A service vehicle 100 is a vehicle capable of autonomous driving for providing a passenger transport service, package delivery service, product sales service, or other mobility service. In the present embodiment, the service vehicle 100 provides a passenger transport service as a mobility service. It picks up a user 2 using the passenger transport service and transports the user 2 to a destination designated by the user 2. The user 2, for example, can operate a smartphone, tablet computer, or other user terminal 3 to launch a vehicle dispatch app and enter the predetermined user information required for vehicle dispatch on the vehicle dispatch app to request the server 200 dispatch the service vehicle 100. The user terminal 3 is configured to be able to communicate with the server 200 through a network configured by optical communication lines etc.

The service vehicle 100 according to the present embodiment is provided with an HMI (human machine interface) 110, communication device 120, surrounding sensors 130, position measuring sensor 135, and control device 140. The HMI 110, communication device 120, surrounding sensors 130, position measuring sensor 135, and control device 140 are connected to be able to communicate through an internal vehicle network 150 based on the Controller Area Network, Automotive Ethernet, or other standard.

The HMI 110 is an interface for transfer of information with the user 2 utilizing the service vehicle 100. The HMI 110 according to the present embodiment is provided with a display 111 as an information display screen placed at a position which the user 2 utilizing the service vehicle 100 can view and a touch panel 112 as an operating device for the user 2 to enter information and respond to questions. The HMI 100 displays output information which is output from the control device 140 (for example, text information or image information) on the display 111 and outputs entered information which is entered through the touch panel 112 to the control device 140.

Note that, the HMI 110 can also be made a user terminal 3 which the user 2 carries rather than such a one mounted in a service vehicle 100. In this case, the user terminal 3 and service vehicle 100 may communicate by short range wireless so as to transfer information, the user terminal 3 and server 200 may communicate, and information may be transferred with the service vehicle 100 indirectly through the server 200.

The communication device 120 has a communicate interface circuit for connecting with a network configured by optical communication lines etc. and is configured to connect the service vehicle 100 with the server 200 through the network and communicate with the server 200.

The surrounding sensors 130 are sensors for generating surrounding data showing the state of the surroundings of the service vehicle 100. In the present embodiment, as the surrounding sensors 130, one or more external cameras 131 for capturing the surroundings of the service vehicle 100 are provided. The external cameras 131 capture the surroundings of the service vehicle 100 by a predetermined frame rate (for example, 10 Hz to 40 Hz) and generate images showing the surroundings of the service vehicle 100. The external cameras 131 output the generated images as surrounding data to the control device 140 each time generating images.

Note that instead of the external cameras 131 or in addition to the external cameras 131, it is also possible to provide a distance measuring sensor for measuring the distance to a vehicle, pedestrian, or other object present in the surroundings of the service vehicle 100 as a surrounding sensor 130. As an example of a distance measuring sensor, for example, a lidar (light detection and ranging device) firing a laser and measuring distance based its reflected light, a millimeter wave radar sensor firing a wave and measuring distance based on the reflected wave, etc. may be mentioned.

The position measuring sensor 135 generates position data showing the current position of the service vehicle 100 and outputs the generated position data of the service vehicle 100 to the control device 140.

The control device 140 is an internal vehicle communication interface 141, storage part 142, and processing part 143.

The internal vehicle communication interface 141 has a communication interface circuit for connecting the control device 140 to the internal vehicle network 150 and is configured to enable the control device 140 and the HMI 110 or other device connected to the internal vehicle network 150 to communicate with each other.

The storage part 142 has an HDD (hard disk drive), SSD (solid state drive), semiconductor memory, or other storage medium and stores various computer programs and data etc. used for processing at the processing part 143.

The processing part 143 has one or more CPUs (central processing units) and their peripheral circuits and runs various computer programs stored in the storage part to comprehensively control the overall operations of the service vehicle 100. For example, it is a processor. One example of the processing performed at the processing part 143 and in turn the control device 140 will be explained later referring to FIG. 2 etc.

The server 200 is provided with a communication part 210, storage part 220, and processing part 230 and manages operations of the service vehicles 100.

The communication part 210 has a communication interface circuit for connecting the server 200 to a network configured by optical communication lines etc. (not shown) and is configured to connect the server 200 to the service vehicles 100 and the user terminals 3 through the network to enable communication with the service vehicles 100 and the user terminals 3.

The storage part 220 has an HDD, SSD, semiconductor memory, or other storage medium and stores the various computer programs, data, etc. used for processing at the processing part 230.

The processing part 230 has one or more CPUs (central processing units) and their peripheral circuits and runs various computer programs stored in the storage part 220 to comprehensively control the overall operation of the server 200. For example, it is a processor. One example of the processing performed at the processing part 230 and in turn the server 200 will be explained later referring to FIG. 2 etc.

Here, if, as in the present embodiment, operating a plurality of service vehicles 100 to provide a mobility service, the business has to enable the service vehicles 100 to communicate with the server 200 through the network to manage the operation of the service vehicles 100. For this reason, for example, there is the danger of someone remotely operating a service vehicle 100 to steal it, stealing data acquired by the sensors of a service vehicle 100 (for example, an image which the external cameras 131 generate) etc., trying to ruin the image of the business, etc. by launching various cyber attacks against a service vehicle 100 through the network.

As a measure if a service vehicle 100 is targeted by a cyber attack, for example, to secure the safety of the user of the service vehicle 100 targeted by the cyber attack, it may be considered to stop providing the mobility service by the service vehicle 100 targeted by the cyber attack. Therefore, for example, if the service vehicle 100 is providing a passenger transport service, it may be considered to take the measure of making the service vehicle 100 stop, making the user disembark, and using another service vehicle 100 to transport the user to the destination.

If one service vehicle 100 operated by a business is targeted by a cyber attack, there is a possibility of other service vehicles 100 also similarly being targeted by a cyber attack. Therefore, if one service vehicle 100 operated by a business is targeted by a cyber attack, it may also be considered to take the measure of stopping providing the mobility service by all service vehicles 100 operated by the business. However, cyber attacks also often end in failure, so if stopping providing a mobility service by all service vehicles 100 each time detecting a cyber attack, the mobility service will frequently end up being stopped. As a result, the users will be inconvenienced, a drop in the quality of service will be invited, and way the users evaluate the business is liable to fall.

Therefore, in the present embodiment, it is judged whether there is a possibility of the service vehicles 100 operated by a business being targeted by a cyber attack and if a service vehicle 100 with such a possibility, that is, a service vehicle 100 with traces of a cyber attack, exhibits abnormal behavior, it is judged that there is a possibility of the cause of the abnormal behavior being a cyber attack. To secure the safety of the users of the service vehicles 100, provision of mobility services by all of the service vehicles 100 operated by the business is stopped.

On the other hand, if a service vehicle 100 with no trace of a cyber attack exhibits abnormal behavior, it is judged that the cause of the abnormal behavior is for example a malfunction of a vehicle sensor or other malfunction of the vehicle and just provision of the mobility service by the service vehicle 100 exhibiting the abnormal behavior is stopped.

Figure 2:
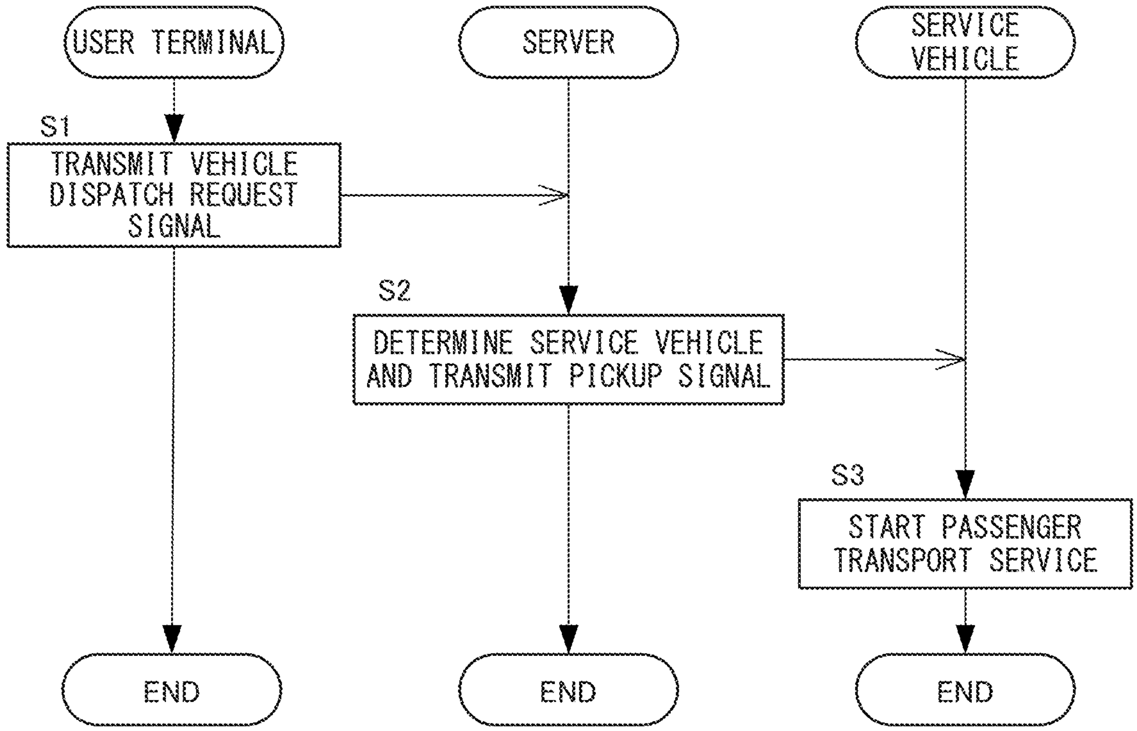
FIG. 2 is a flow chart explaining one example of the contents of processing performed by a user terminal, service vehicle, and server according to the first embodiment of the present invention when a user requests vehicle dispatch.

FIG. 2 is a flow chart explaining one example of the contents of processing performed by a user terminal 3, service vehicle 100, and server 200 when a user 2 requests vehicle dispatch.

Note that, in the present embodiment, each service vehicle 100 is assumed to periodically transmit position data of the host vehicle to the server 200. That is, in the present embodiment, the server 200 is assumed to be able to obtain a grasp of the current position of each service vehicle 100.

At step S1, the user 2 operates the user terminal 3 to launch a vehicle dispatch appl and enters the predetermined user information required for vehicle dispatch on the vehicle dispatch app to request the dispatch of a service vehicle 100. As the user information, for example, individual information of the user or the desired vehicle dispatch location, desired vehicle dispatch time, number of persons using the service, etc. may be mentioned. The user terminal 3 transmits a vehicle dispatch request signal including the user information to the server 200 if requesting vehicle dispatch through the vehicle dispatch app.

At step S2, if receiving the vehicle dispatch request signal, the server 200 determines the service vehicle 100 to be used for pickup from among the service vehicles 100 based on the desired vehicle dispatch location contained in the signal, the position data of service vehicles 100 periodically received from the service vehicles 100, etc. and transmits to the service vehicle 100 a signal requesting pickup including predetermined pickup information required for pickup. As pickup information, for example, individual information of the user, the desired vehicle dispatch location, and information relating to the running route to the destination (below, referred to as the "running route information") etc. may be mentioned.

At step S3, if receiving a pickup signal, the control device 140 of the service vehicle 100 starts automatic driving and starts to provide the passenger transport service based on the running route information etc. contained in the signal.

Figure 3:
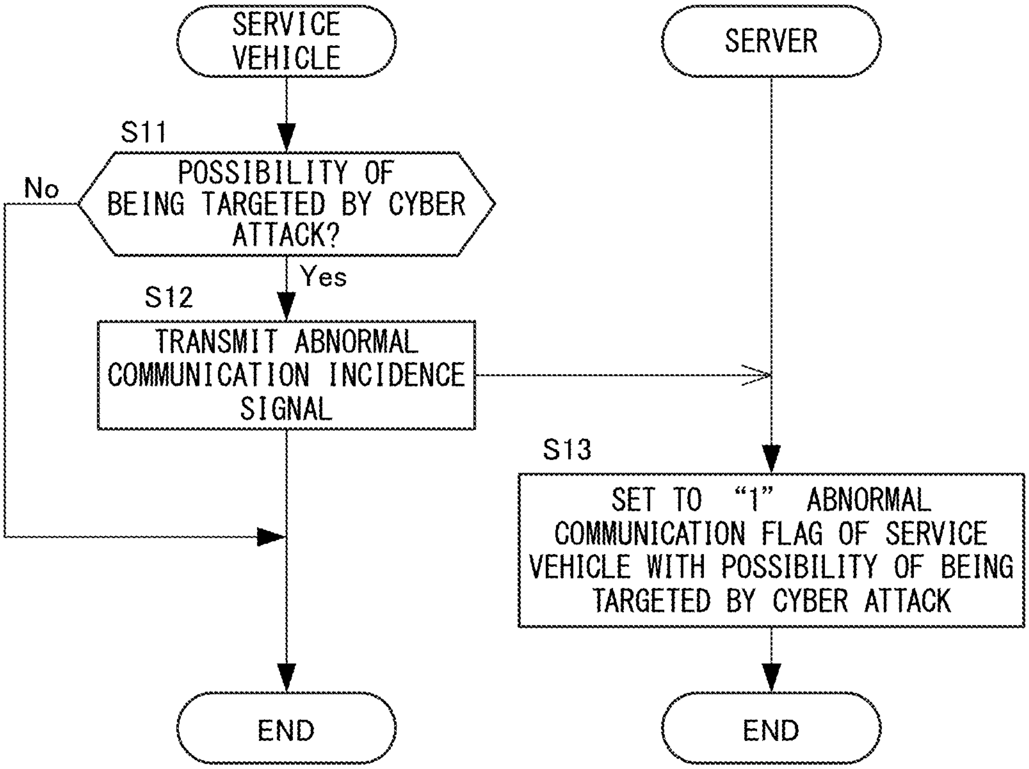
FIG. 3 is a flow chart explaining one example of the contents of processing performed by a service vehicle and server according to the first embodiment of the present invention when a service vehicle detects traces of a cyber attack.

FIG. 3 is a flow chart explaining one example of the contents of processing performed by a service vehicle 100 and the server 200 when a service vehicle 100 detects traces of a cyber attack. The service vehicle 100 repeatedly performs the present routine at predetermined processing periods.

At step S11, the control device 140 of the service vehicle 100 judges if there is any possibility of having been targeted by a cyber attack (where there has been any abnormal communication). The service vehicle 100 according to the present embodiment usually communicates with the server 200 or other limited communication destinations (below, referred to "the usual communication destinations"). Therefore, the control device 140 of the service vehicle 100 can, for example, judge that there has been abnormal communication and judge there is the possibility of having been targeted by a cyber attack when detecting communication from a communication destination of an IP address different from the usual communication destinations. Note that, judgment of any possibility of having been targeted by a cyber attack (any trace of having been targeted by a cyber attack) is not limited to the above method and may be performed by various known techniques. If there is the possibility of having been targeted by a cyber attack, the control device 140 of the service vehicle 100 proceeds to the processing of step S12. On the other hand, if there is no possibility of having been targeted by a cyber attack, the service vehicle 100 ends the current processing At step S12, the control device 140 of the service vehicle 100 informs the server 200 that there is the possibility of its host vehicle having been targeted by a cyber attack by transmitting to the server 200 an abnormal communication incidence signal including vehicle identifying information of the host vehicle (for example, license plate number etc.)

At step S13, if receiving an abnormal communication incidence signal, the server 200 identifies the service vehicle 100 originating the signal, that is, the service vehicle 100 with the possibility of being targeted by a cyber attack, from the service vehicles 100 whose operation is managed based on the vehicle identification information contained in the signal and sets the abnormal communication flag of the specified service vehicle 100 to "1". The initial value of each abnormal communication flag of the service vehicles 100 is set to "0". After being set to "1", for example, it is returned to "0" by the manager of the server 200.

Figure 4:
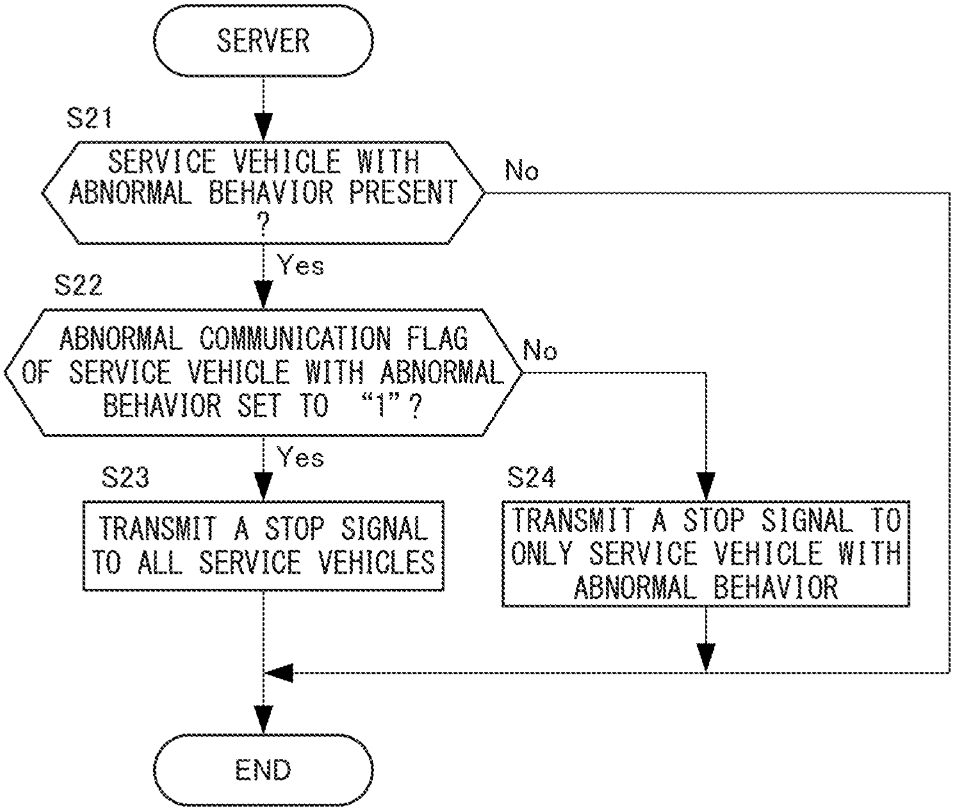
FIG. 4 is a flow chart explaining one example of the contents of processing performed at a server according to the first embodiment of the present invention when a service vehicle exhibits abnormal behavior.

FIG. 4 is a flow chart explaining one example of the contents of processing performed at the server 200 when a service vehicle 100 exhibits abnormal behavior. The server 200 repeatedly performs the present routine at predetermined processing periods.

At step S21, the server 200 judges if there is a service vehicle 100 exhibiting abnormal behavior, that is, an abnormal vehicle, among the service vehicles 100. For example, the server 200 judges if there is a service vehicle 100 departing from its running route (that is, a service vehicle 100 not heading toward the desired vehicle dispatch location or destination) based on the running route information of the service vehicles 100 and the position data of the service vehicles 100 and can judge that an abnormal vehicle is present if there is a service vehicle 100 departing from its running route. The server 200 proceeds to the processing of step S22 if there is an abnormal vehicle present. On the other hand, the server 200 ends the current processing if there is no abnormal vehicle present.

At step S22, the server 200 identifies a service vehicle 100 exhibiting abnormal behavior and judges if the abnormal communication flag of the service vehicle 100 has been set to "1". If the abnormal communication flag of the service vehicle 100 has been set to "1", the server 200 judges that there is the possibility that the cause of the abnormal behavior is a cyber attack and proceeds to the processing of step S23. On the other hand, if the abnormal communication flag of the service vehicle 100 exhibiting abnormal behavior has been set to "0", the server 200 judges that the cause of the abnormal behavior is not a cyber attack, but for example a malfunction of a vehicle sensor or other malfunction of the vehicle rather than a cyber attack and proceeds to the processing of step S24.

At step S23, the server 200 transmits a stop signal to all of the service vehicles 100 whose operation is being managed. A stop signal is a signal for making a service vehicle 100 receiving that signal make an emergency stop at a nearby safe location.

At step S24, the server 200 transmits a stop signal to only a service vehicle 100 exhibiting abnormal behavior.

The server 200 (operation management apparatus) according to the present embodiment explained above is a server for managing operations of a plurality of service vehicles 100 capable of autonomous driving. It is provided with a communication part 210 configured to be able to communicate with the service vehicles 100 and a processing part 230. The processing part 230 detects the presence of an abnormal vehicle exhibiting abnormal behavior from among the plurality of service vehicles 100 and, if detecting the presence of an abnormal vehicle, transmits a stop signal to all service vehicles 100 whose operation is being managed for ordering them to stop when receiving from the abnormal vehicle an abnormal communication incidence signal informing it that there has been abnormal communication different from the usual communications to the abnormal vehicle and transmits a stop signal to only the abnormal vehicle when not receiving from the abnormal vehicle an abnormal communication incidence signal.

In this way, according to the present embodiment, if detecting the presence of an abnormal vehicle, provision of a mobility service by all service vehicles 100 whose operation is being managed is temporarily stopped only if having received an abnormal communication incidence signal from the abnormal vehicle. If not receiving an abnormal communication incidence signal from the abnormal vehicle, provision of a mobility service by the other service vehicles 100 whose operations is being managed is continued. For this reason, even if a service vehicle 100 which a business operating a mobility service is using is targeted by a cyber attack, it is possible to secure the safety of the users of the service vehicles 100 while continuing service to the extent possible at the service vehicles 100.

Further, the processing part 230 of the server 200 according to the present embodiment is configured to judge if a service vehicle 100 is an abnormal vehicle when the service vehicle 100 departs from a preset running route based on position data of the service vehicle 100 received from the service vehicle 100. Due to this, it is possible to objectively judge an abnormality of a service vehicle 100 from the server 200 side by an easy method.

Second Embodiment

Next, a second embodiment of the present invention will be explained. The present embodiment differs from the first embodiment on the point of taking countermeasures against a cyber attack in accordance with the number of service vehicles 100 with abnormal communication flags set to "1". Below, this point of difference will be focused on in the explanation.

In the above-mentioned first embodiment, a countermeasure against cyber attack (transmission of stop signal) was taken for a service vehicle 100 exhibiting abnormal behavior, but in the present embodiment, in addition to this countermeasure, a countermeasure is taken against a cyber attack even when the number of service vehicles 100 with abnormal communication flags set to "1" exceeds a predetermined number.

Figure 5:
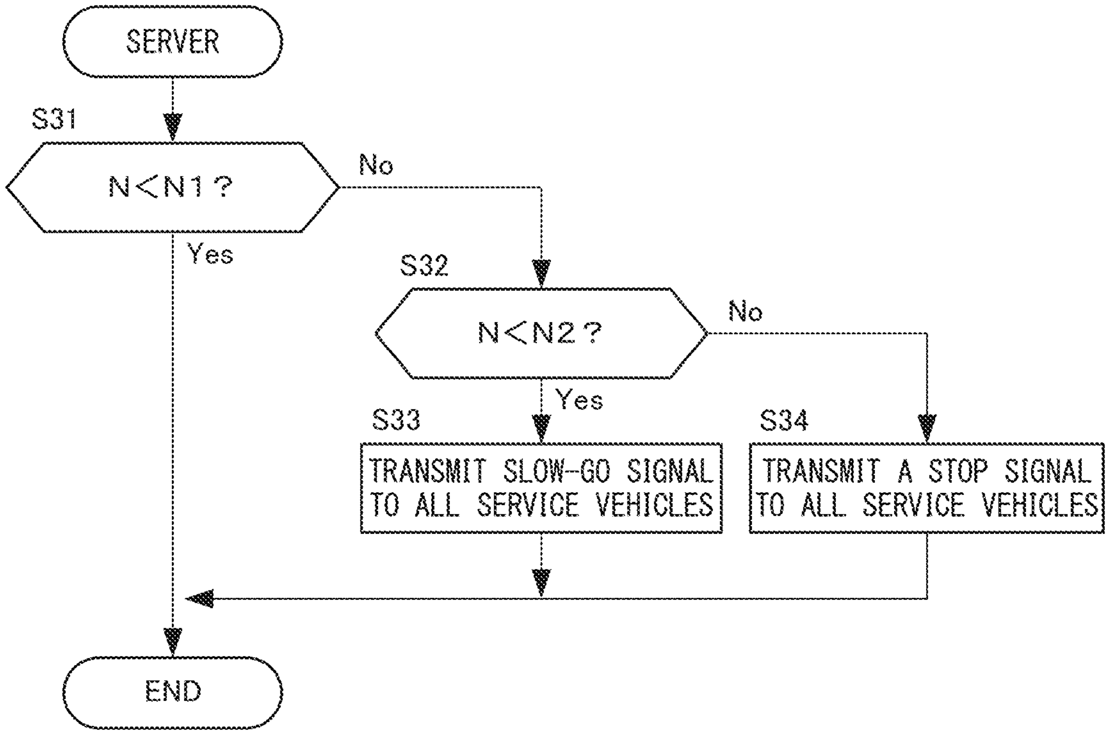
FIG. 5 is a flow chart explaining one example of the contents of processing performed at a server according to a second embodiment of the present invention.

FIG. 5 is a flow chart explaining one example of the contents of processing performed at a server 200 according to the present embodiment. The server 200 repeatedly performs the present routine at predetermined processing periods.

At step S31, the server 200 judges whether the number N of service vehicles 100 with abnormal communication flags set to "1" is less than a predetermined first threshold value N1. The server 200 ends the current processing if the number N of service vehicles 100 with abnormal communication flags set to "1" is less than the predetermined first threshold value N1. On the other hand, the server 200 proceeds to the processing of step S32 if the number N of service vehicles 100 with abnormal communication flags set to "1" is greater than or equal to the first threshold value N1.

At step S32, the server 200 judges whether the number N of service vehicles 100 with abnormal communication flags set to "1" is less than a predetermined second threshold value N2. The second threshold value is made a value larger than the first threshold value N1. The server 200 proceeds to the processing of step S33 if the number N of service vehicles 100 with abnormal communication flags set to "1" is less than the second threshold value N2. On the other hand, the server 200 proceeds to the processing of step 34 if the number N of service vehicles 100 with abnormal communication flags set to "1" is greater than or equal to the second threshold value N2.

At step S33, the server 200 transmits a slow-go signal to all service vehicles 100 whose operation is being managed. The slow-go signal is a signal for making a service vehicle 100 receiving the signal go slowly.

At step S34, the server 200 transmits a stop signal to all service vehicles 100 whose operation is being managed.

The processing part 230 of the server 200 according to the present embodiment explained above is configured to transmit a slow-go signal to all of the service vehicles 100 whose operation is being managed for ordering them to go slowly if the number N of the service vehicles 100 transmitting the abnormal communication incidence signal is greater than or equal to the first threshold value N1 and less than the second threshold value N2 larger than the first threshold value N1 and to transmit the stop signal to all of the service vehicles 100 whose operation is being managed if the number N of the service vehicles 100 transmitting the abnormal communication incidence signal is greater than or equal to the second threshold value N2.

Due to this, if the possibility rises of the number N of the service vehicles 100 transmitting the abnormal communication incidence signal becoming greater than or equal to the first threshold value N1 and the business being targeted by a cyber attack, even if the presence of an abnormal vehicle is not detected, it is possible to order all of the service vehicles 100 whose operation is being managed to go slow. Further, if the possibility further rises of the number N of the service vehicles 100 transmitting the abnormal communication incidence signal becoming greater than or equal to the second threshold value N2 and the business being targeted by a cyber attack, even if the presence of an abnormal vehicle is not detected, it is possible to order all of the service vehicles 100 whose operation is being managed to make an emergency stop. Therefore, it is possible to even better secure the safety of the users of the service vehicles 100.

Above, embodiments of the present invention were explained, but the embodiments only show some of the applications of the present invention and are not meant to limit the technical scope of the present invention to the specific configurations of the embodiments.

For example, in the above embodiments, the running routes were generated at the server 200 side and transmitted to the service vehicles 100, but it is also possible to generate running routes at the service vehicle 100 side based on the desired locations for vehicle dispatch and destinations and transmit them to the server 200.

Further, in the above embodiments, the computer programs run at the service vehicles 100 and the server 200 may be provided in a form recorded at a computer readable portable recording medium such as a semiconductor memory, magnetic recording medium, or optical recording medium.

The invention claimed is:

1. An operation management apparatus configured to manage the operation of a plurality of vehicles capable of autonomous driving, wherein the operation management apparatus comprises:

a communication part configured to be able to communicate with the vehicles; and a processing part, and wherein the processing part is configured:

to detect the presence of any abnormal vehicle exhibiting abnormal behavior from among the plurality of vehicles; and, if detecting the presence of an abnormal vehicle, to transmit a stop signal to all of the vehicles whose operation is being managed for ordering them to stop in response to receiving an abnormal communication incidence signal from the abnormal vehicle indicating that there has been abnormal communication different from the usual communications to the abnormal vehicle, and to transmit the stop signal to only the abnormal vehicle in response to failing to receive from the abnormal vehicle the abnormal communication incidence signal, wherein at least one of the following conditions is satisfied:

the abnormal communication incidence signal indicates that a control device of the abnormal vehicle detected communication from a communication destination having an IP address different from IP addresses of usual communication destinations of the abnormal vehicle, the processing part sets an abnormal communication flag of the abnormal vehicle when receiving the abnormal communication incidence signal from the abnormal vehicle, and to judge that there is a possibility that a cause of abnormal behavior exhibited by the abnormal vehicle is a cyber attack when the abnormal communication flag of the abnormal vehicle has been set, or the processing part judges that a cause of abnormal behavior exhibited by the abnormal vehicle is a malfunction of the abnormal vehicle rather than a cyber attack when not receiving the abnormal communication incidence signal from the abnormal vehicle.

2. The operation management apparatus according to claim 1, wherein the processing part is further configured:

to transmit a slow-go signal to all of the vehicles whose operation is being managed for ordering them to go slowly if the number of the vehicles transmitting the abnormal communication incidence signal is greater than or equal to a first threshold value and less than a second threshold value larger than the first threshold value; and to transmit the stop signal to all of the vehicles whose operation is being managed if the number of the vehicles transmitting the abnormal communication incidence signal is greater than or equal to the second threshold value.

3. The operation management apparatus according to claim 1, wherein the processing part is further configured to judge that a vehicle is an abnormal vehicle when detecting that the vehicle has departed from a preset running route based on position data of the vehicle received from the vehicle.

4. A nontransitory computer recording medium containing a computer program for use by an operation management apparatus communicating with a plurality of vehicles capable of autonomous driving and managing the operation of the vehicles, the nontransitory computer recording medium containing a computer program:

making the operation management apparatus detect the presence of any abnormal vehicle exhibiting abnormal behavior from among the plurality of vehicles; and, if detecting the presence of an abnormal vehicle, making it transmit a stop signal to all of the vehicles whose operation is being managed for ordering them to stop in response to receiving an abnormal communication incidence signal from the abnormal vehicle indicating that there has been abnormal communication different from the usual communications to the abnormal vehicle, and making it transmit the stop signal to only the abnormal vehicle in response to failing to receive from the abnormal vehicle the abnormal communication incidence signal, wherein at least one of the following conditions is satisfied:

the abnormal communication incidence signal indicates that a control device of the abnormal vehicle detected communication from a communication destination having an IP address different from IP addresses of usual communication destinations of the abnormal vehicle, setting an abnormal communication flag of the abnormal vehicle when receiving the abnormal communication incidence signal from the abnormal vehicle, and to judge that there is a possibility that a cause of abnormal behavior exhibited by the abnormal vehicle is a cyber attack when the abnormal communication flag of the abnormal vehicle has been set, or judging that a cause of abnormal behavior exhibited by the abnormal vehicle is a malfunction of the abnormal vehicle rather than a cyber attack when not receiving the abnormal communication incidence signal from the abnormal vehicle.

5. An operation management method by an operation management apparatus communicating with a plurality of vehicles capable of autonomous driving and managing the operation of the vehicles, wherein the operation management method includes:

detecting the presence of any abnormal vehicle exhibiting abnormal behavior from among the plurality of vehicles; and, if detecting the presence of an abnormal vehicle, transmitting a stop signal to all of the vehicles whose operation is being managed for ordering them to stop in response to receiving an abnormal communication incidence signal from the abnormal vehicle indicating that there has been abnormal communication different from the usual communications to the abnormal vehicle, and transmitting the stop signal to only the abnormal vehicle in response to failing to receive from the abnormal vehicle the abnormal communication incidence signal, wherein at least one of the following conditions is satisfied:

the abnormal communication incidence signal indicates that a control device of the abnormal vehicle detected communication from a communication destination having an IP address different from IP addresses of usual communication destinations of the abnormal vehicle, setting an abnormal communication flag of the abnormal vehicle when receiving the abnormal communication incidence signal from the abnormal vehicle, and to judge that there is a possibility that a cause of abnormal behavior exhibited by the abnormal vehicle is a cyber attack when the abnormal communication flag of the abnormal vehicle has been set, or judging that a cause of abnormal behavior exhibited by the abnormal vehicle is a malfunction of the abnormal vehicle rather than a cyber attack when not receiving the abnormal communication incidence signal from the abnormal vehicle.

6. The operation management apparatus according to claim 1, wherein the stop signal is configured to order a vehicle receiving the stop signal to make an emergency stop at a nearby safe location.

7. The nontransitory computer recording medium according to claim 4, wherein the stop signal is configured to order a vehicle receiving the stop signal to make an emergency stop at a nearby safe location.

8. The operation management method according to claim 5, wherein the stop signal is configured to order a vehicle receiving the stop signal to make an emergency stop at a nearby safe location.

* * * * *